United States Patent [19]

Senso et al.

[11] Patent Number: 5,159,450

[45] Date of Patent: Oct. 27, 1992

[54] NOISE REDUCTION CIRCUIT AND COMPATABLE PLURAL-UNIT DISPLAY

[75] Inventors: Hitoshi Senso; Taketo Kakegawa; Masao Fukuda, all of Tokyo, Japan

[73] Assignee: Pioneer Electronic Corporation, Tokyo, Japan

[21] Appl. No.: 562,535

[22] Filed: Aug. 3, 1990

Related U.S. Application Data

[63] Continuation-in-part of Ser. No. 545,023, Jun. 28, 1990, abandoned.

[30] Foreign Application Priority Data

Oct. 5, 1989 [JP] Japan .................................. 1-258695
Oct. 9, 1989 [JP] Japan .................................. 1-262094

[51] Int. Cl.$^5$ .......................... H04N 7/01; H04N 5/21
[52] U.S. Cl. .................................. 358/140; 358/167; 358/240
[58] Field of Search ................ 358/22, 180, 183, 140, 358/167, 240

[56] References Cited

U.S. PATENT DOCUMENTS

| | | | |
|---|---|---|---|
| 3,789,133 | 1/1974 | Kline | 358/162 |
| 4,573,075 | 2/1986 | Bolger | 358/167 |
| 4,866,520 | 9/1989 | Nomura et al. | 358/22 X |
| 4,962,426 | 10/1990 | Naoi et al. | 358/167 |
| 4,984,081 | 1/1991 | Miyoshi et al. | 358/180 |
| 5,010,413 | 4/1991 | Bahr | 358/22 X |

FOREIGN PATENT DOCUMENTS

| | | |
|---|---|---|
| 57-109467 | 7/1982 | Japan . |
| 58-205905 | 12/1983 | Japan . |
| 62-48878 | 3/1987 | Japan . |
| 62-274993 | 11/1987 | Japan . |
| 1-264484 | 10/1989 | Japan . |
| 2-224483 | 9/1990 | Japan . |

*Primary Examiner*—James J. Groody
*Assistant Examiner*—Mark R. Powell
*Attorney, Agent, or Firm*—Sughrue, Mion, Zinn, Macpeak & Seas

[57] ABSTRACT

A video image displaying system comprises first video equipment for converting a HDTV video signal to a plurality of video signals of a second format for display on a plurality of television receivers responsive to signals of the second format and second video equipment for providing one or more video signals of the second format to selected television receivers in response to a switching circuit. The image displaying system includes a noise reduction circuit, with coring circuit, in which the characteristics of first and second filters are set in such a way as their overall characteristic becomes flat so as to reduce a noise overlapping a high frequency range of a video signal. The image displaying system further includes a synchronizing signal generator which provides a phase difference between synchronizing signals to be supplied to a first and second video equipments, thus compensating for a delay time of the high definition television signal encountered in an image dividing unit. Preferably, the high definition television signal a Hi-vision signal and the second format television signal is a NTSC television signal.

9 Claims, 7 Drawing Sheets

FIG. 1

FIG. 3A (PRIOR ART)
HI-VISION SCREEN

FIG. 3B (PRIOR ART)
NTSC MULTI SCREEN

FIG. 8

FIG. 2A
(LPF)

FIG. 2B

FIG. 2C
(HPF)

(a) CLOCK SIGNAL fh (b) COUNTED VALUE OF COUNTER (c) OUTPUT OF ROM (d) INPUT OF FRAME MEMORY (COUNTED VALUE)

(e) OUTPUT OF COMPARATOR (COUNTED VALUE)

(f) OUTPUT OF FRAME MEMORY

NOISE REDUCTION CIRCUIT AND COMPATABLE PLURAL-UNIT DISPLAY

This application is a CIP of Ser. No. 545,023, filed Jun. 28, 1990 and now abandoned.

BACKGROUND OF THE INVENTION

1. Field of the Invention

This invention relates to a high definition television system, more particularly to a noise reduction circuit for reducing a noise in a high frequency range overlapping an output signal of a high definition television camera. The invention also relates to a high definition television image displaying system in which divided image signals in accordance with a high definition television system are displayed simultaneously on a screen composed of a plurality of present television receiver sets to form one. According to one aspect of the present invention, an image signal from another NTSC television equipment can be selectively supplied to one of the plurality of the present television receiver sets for display.

2. Description of the Prior Art

As a new television system standard for replacing the present television system standard, there has been proposed a high definition television system, for example, a Hi-vision system capable of providing a high degree of visual and psychological effects such as a sense of immediacy and a sense of power, which are superior to that of the present television system as well as being improved in picture quality and sound quality.

Because the Hi-vision system differs considerably from the present television system, such as an NTSC television system, in its screen displaying system, scanning system, sound reproducing system and the like, it is impossible to reproduce an image of a Hi-vision signal simply by using an NTSC television receiver. Therefore, there have been proposed various displaying systems, wherein differences in a number of scanning lines, aspect ratio, horizontal scanning frequency and the like between these two systems are assimilated to that of the NTSC television signal for displaying the Hi-vision signal.

Figure 3A:
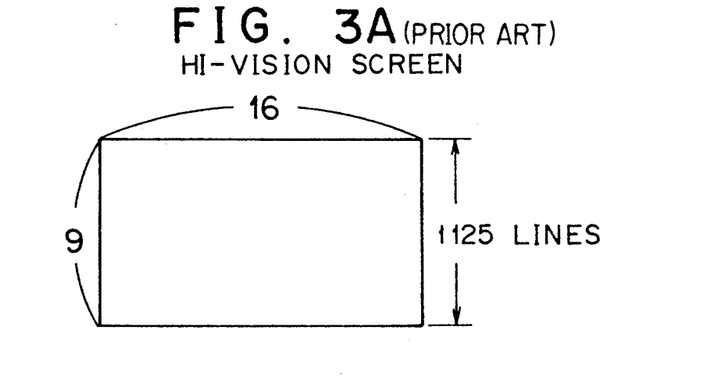
FIGS. 3A and 3B are diagrams showing a screen configuration for a Hi-vision/NTSC television signal conversion and displaying system.
Figure 3B:
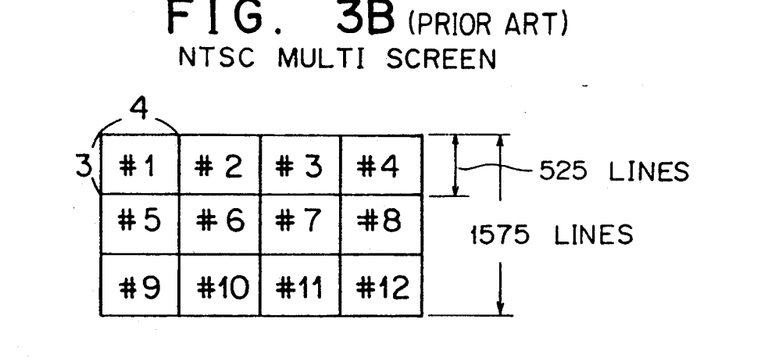

FIGS. 3A and 3B are illustrations of screen configurations for illustrating an example of a Hi-vision/NTSC television signal conversion and display system as described above, wherein a Hi-vision screen (FIG. 3A) having 1,125 horizontal scanning lines and an aspect ratio of 16:9 is divided into the total of twelve screens, three vertical screens by four horizontal screens, by using a scan converter. Hi-vision signals being divided for each of the screens are displayed on one composite screen (FIG. 3B) comprised of the twelve NTSC television receiver sets #1 to #12 after converting them into NTSC television signals, whereby each NTSC television screen has 525 horizontal scanning lines and an aspect ratio of 4:3. If multi-display projection units are used for the NTSC television receiver sets #1 to #12, a high definition television image can be displayed on the composite screen with sufficient brightness for practical use.

However, in order to convert the Hi-vision signal into the NTSC television signals for display, it is necessary to decrease a number of scanning lines of the Hi-vision signal, therefore it is impossible to reproduce an image of high picture quality. In view of this fact, there has been proposed a displaying system in which one Hi-vision image is divided into a plurality of images, the divided images are then displayed on one composite screen composed of a plurality of NTSC television receiver sets, thereby an image of high picture quality is reproduced without reducing a number of scanning lines (See Ja. Pat. Appln. No. Sho 63-92987). In addition, there has been also proposed another displaying system for displaying an image from other NTSC television equipment on one or more of a plurality of NTSC television receiver sets (See Ja. Pat. Appln. No. Hei 1-43173).

In the displaying system shown in FIG. 3B, if a Hi-vision signal having a band width of 20 MHz is spreaded on twelve screens through a scan converter, the Hi-vision signal can be converted into a plurality of NTSC television signals, each of which has a band width of 2.33 MHz. In this case, if an output signal of a Hi-vision camera is converted directly into the NTSC television signals for twelve screens, there arises a problem such that a noise in the high frequency range, approximately 20 MHz, which has not been noticeable on the Hi-vision screen, becomes noticeable on the converted NTSC television screens due to the fact that the output signal of the Hi-vision camera includes a noise (a triangular noise), the an amplitude of which increases in proportion to a frequency increase.

This problem is caused by the fact that the spreading of the Hi-vision signal having the band width of 20 MHz on twelve screens through a scan converter converts the Hi-vision signal into the NTSC television signals having the band width of 2.33 MHz and that a noise of 20 MHz simultaneously into about 2 MHz at which frequency the visual sensitivity of human eyes is found to be the highest. Thus, the noise in the high frequency range, which has not been noticeable on the Hi-vision screen, becomes noticeable on the NTSC screens after the scan conversion.

Furthermore, when the Hi-vision image is divided into a plurality of NTSC television images and displayed on a plurality of NTSC television receiver sets, or an image from other NTSC television equipment is displayed on a plurality of NTSC television receiver sets, that is, in case that the Hi-vision image and the NTSC television image are displayed, by switching, on respective NTSC television receiver sets, it is necessary to supply respective synchronizing signals to the Hi-vision equipment for generating the Hi-vision signal and to the NTSC television equipment for generating the NTSC television signal in order to provide synchronization therebetween.

However, the Hi-vision signal generated by the Hi-vision equipment is delayed more than one field at a stage, into a plurality of NTSC television signals, thus resulting in a phase difference between the Hi-vision signal and the NTSC television signal which is generated by the NTSC television equipment. Therefore, if the Hi-vision image and the NTSC television image are changed over during display, there is caused an instantaneous picture disturbance at the time of changing over.

It is therefore an object of this invention to reduce noise in a high frequency range contained in a high definition television signal in advance of a scan conversion and to reduce an visually disturbing noise generated upon converting the high definition television signal into the present television signals.

It is another object of this invention to provide an image displaying system wherein a picture disturbance is prevented when performing a changing-over in displaying, after converting an image of the high definition television system into a plurality of images of the present television system, between the converted images and an image generated by another video equipment of the present television system.

SUMMARY OF THE INVENTION

This invention is comprised of a first filter means for suppressing a signal level in a high frequency range of an image signal, a coring means for cutting off a minute signal level of the image signal which is fed from the filter means, and a second filter means for suppressing a signal level in a low frequency range of an output signal derived from the coring means, whereby the characteristics of the first and second filter means are set in such a way that their characteristics together form a flat response and a noise in higher frequency range overlapping the image signal is reduced.

An image displaying system of this invention is further comprised of first video equipment for transmitting a high definition television signal, second video equipment for transmitting a signal of the present television system, an image dividing means for dividing an image of the high definition television system fed from the first video equipment into a plurality of images of the present television system, an image displaying mean having a display screen comprised of a plurality of present television receiver sets for displaying the divided images and an image of the present television system fed from the second video equipment selectively on the display screen, and a synchronizing signal generating means for generating synchronizing signals for establishing a synchronization between the first and second video equipments, whereby the synchronizing signal generating means provides a relative phase difference between a synchronizing signal to be fed to the first video equipment and a synchronizing signal to be fed to the second video equipment which corresponds to a delay time involved in the television signal at the image dividing means.

With the configuration described above, the high definition television signal fed to the first filter means is in turn fed to the coring means for cutting off a minute signal level in a high frequency range after suppressing a signal level in the high frequency range with respect to a signal level in a low frequency range. Since the second filter means is constructed so as to suppress the signal level in the low frequency range conversely to the first filter means the high definition television signal is brought back to its original flat signal level after passing through these two filter means while a noise in high frequency range is removed from an output of the coring means.

Further in accordance with a specific embodiment of this invention, the high definition television signal derived from the first video equipment is processed by the image dividing means in such a way as to divide one high definition television image into a plurality of images, each of which is converted into a signal of the present television system. The plurality of these converted signals of the present television system are displayed on the image displaying means comprised of a plurality of conventional television receiver sets for the present television system.

According to this displaying system, the high definition television image can be displayed on the composite screen consisting of a plurality of conventional television receiver sets without reducing the number of scanning lines. In addition the image can be displayed on the large screen with sufficient brightness while maintaining high definition.

When displaying a plurality of images attained by dividing one high definition television image fed from the first video equipment at the image dividing means or an image of the present television system fed from the second video equipment selectively on the screen through a switching operation, it is necessary to provide synchronization between the first and second video equipments by making use of the synchronizing signal generating means. However, since the high definition television signal fed from the first video equipment is delayed at the image dividing means, a phase difference between the synchronizing signals to be supplied to the both video equipments is so selected by the synchronizing signal generating means as to compensate this delay time.

DESCRIPTION OF THE PREFERRED EMBODIMENTS

Figure 1:
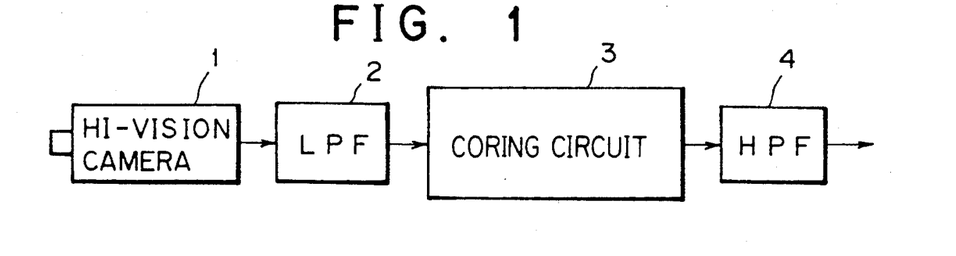
FIG. 1 is a block diagram showing an embodiment of a noise reduction circuit for a video signal according to this invention.

FIG. 1 is a block diagram showing as noise reducing circuit for a video signal embodying this invention.

In the following description, the Hi-vision system is employed as the high definition television system whilst the NTSC television system is employed as the present television system as a matter of convenience for describing preferred embodiments of this invention.

This noise reducing circuit is comprised of a filter circuit 2 of a low pass filter (LPF) configuration for suppressing a signal level in a high frequency range of an output signal of a Hi-vision camera 1, a coring circuit 3 for cutting a minute signal level portion from an output signal of the filter circuit 2 and a filter circuit 4 having a high pass filter (HPF) for expanding the signal level in the high frequency range of an output signal of the coring circuit 3.

Figure 2A:
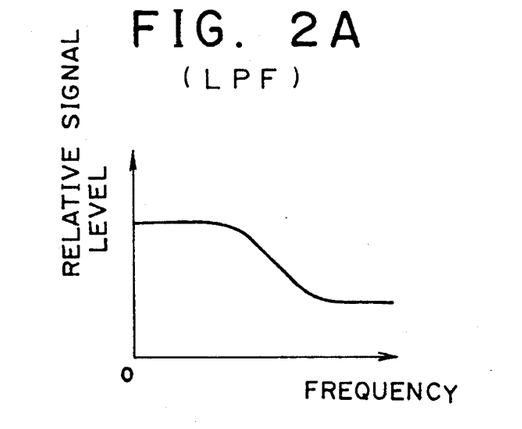
FIGS. 2A, 2B and 2C are characteristic diagrams illustrating an operation of the circuit shown in FIG. 1.
Figure 2B:
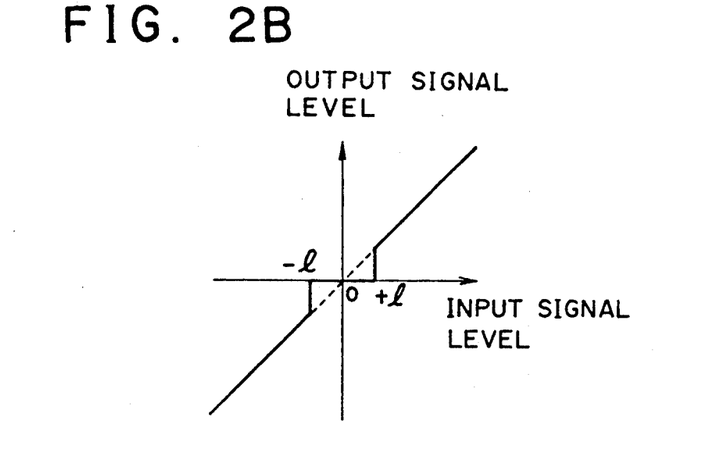
Figure 2C:
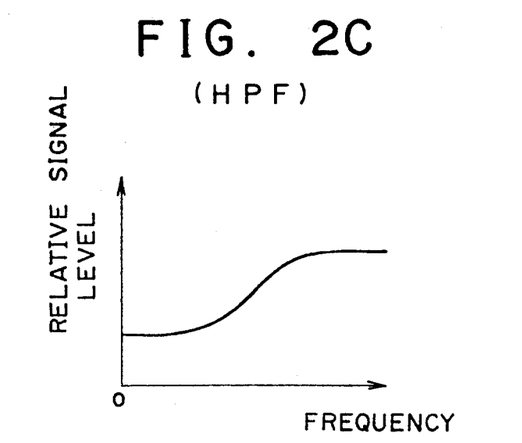

According to this embodiment, as shown in FIG. 2A, the output signal of the Hi-vision camera 1 is derived therefrom through the LPF 2 while the signal level in the higher frequency range being suppressed relatively as compared with the signal level in the lower frequency range and then fed to the coring circuit 3. As shown in FIG. 2B, a minute signal between coring −1 and +1 is cut off by the minute signal level cut off circuit 3 and then the resultant signal is fed to the HPF 4. As shown in FIG. 2C, the signal fed to the HPF 4 is, in contrast with the LPF 2, suppressed in its low frequency range. Characteristics of the both filters 2 and 4 are selected so that the total of the characteristics thereof are flatly suppressed. Accordingly, the video signal derived from the Hi-vision camera 1 has a reduced noise level in its high frequency range.

Figure 4:
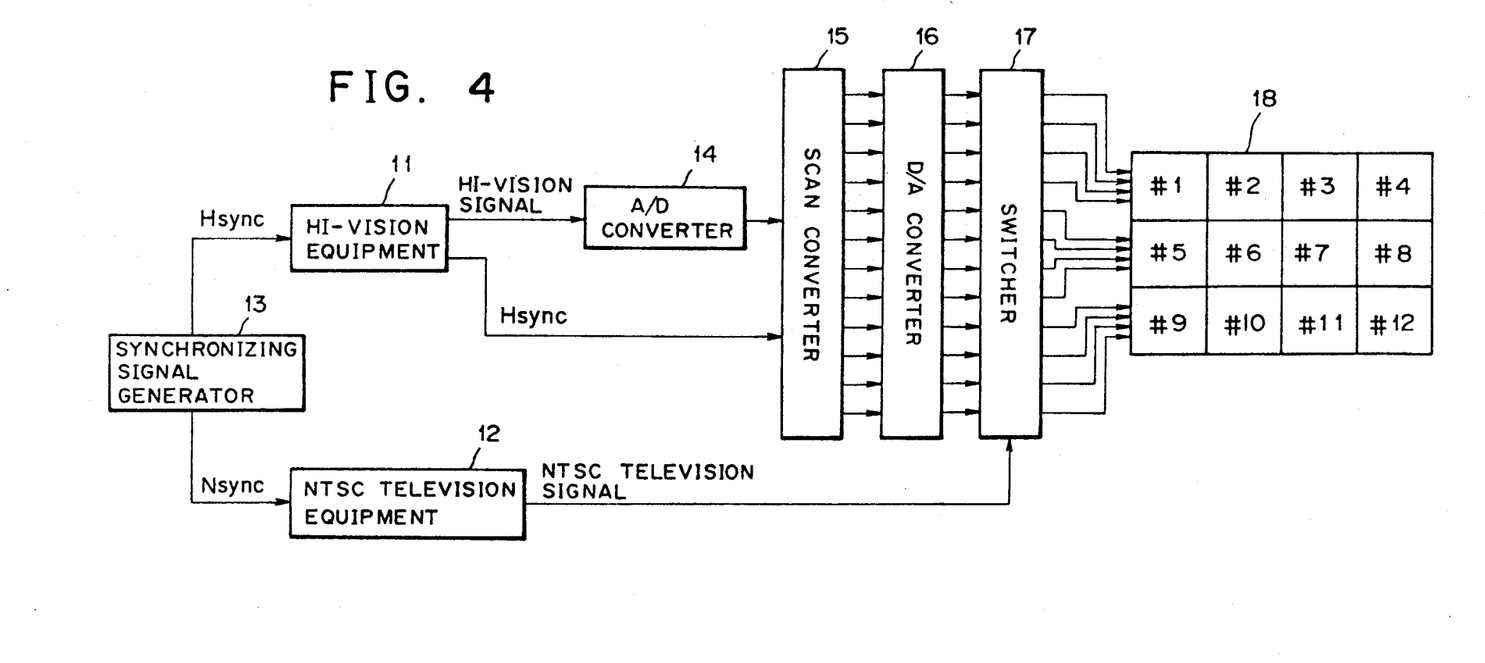
FIG. 4 is a block diagram showing an embodiment of an image displaying system according to this invention.

Now referring to FIG. 4, there is shown a block diagram of an image displaying system in accordance with this invention.

This preferred embodiment is comprised of Hi-vision equipment 11 for producing a Hi-vision signal, NTSC television equipment 12 for producing an NTSC television signal, a synchronizing signal generator for supplying a synchronizing signal to both equipments respectively, an analog to digital (A/D) converter 14 for converting the Hi-vision signal into a digital signal, a scan converter 15 for converting a number of horizontal scanning lines of the Hi-vision signal, which is converted by the A/D converter 14, into three parts in a vertical direction and four parts in a horizontal direction for every frame so as to generate image signals in the total of 12 sets per frame, a D/A converter 16 for converting the 12 sets of digital image signals into analog signals of the NTSC television system, a switcher 17 for providing a selective changeover between the 12 sets of the converted NTSC television signals and the NTSC television signal from the NTSC television equipment 12, and a display unit 18 consisting of twelve NTSC television receiver sets #1 to #12 for displaying twelve sets of NTSC television signals simultaneously.

Figure 5:
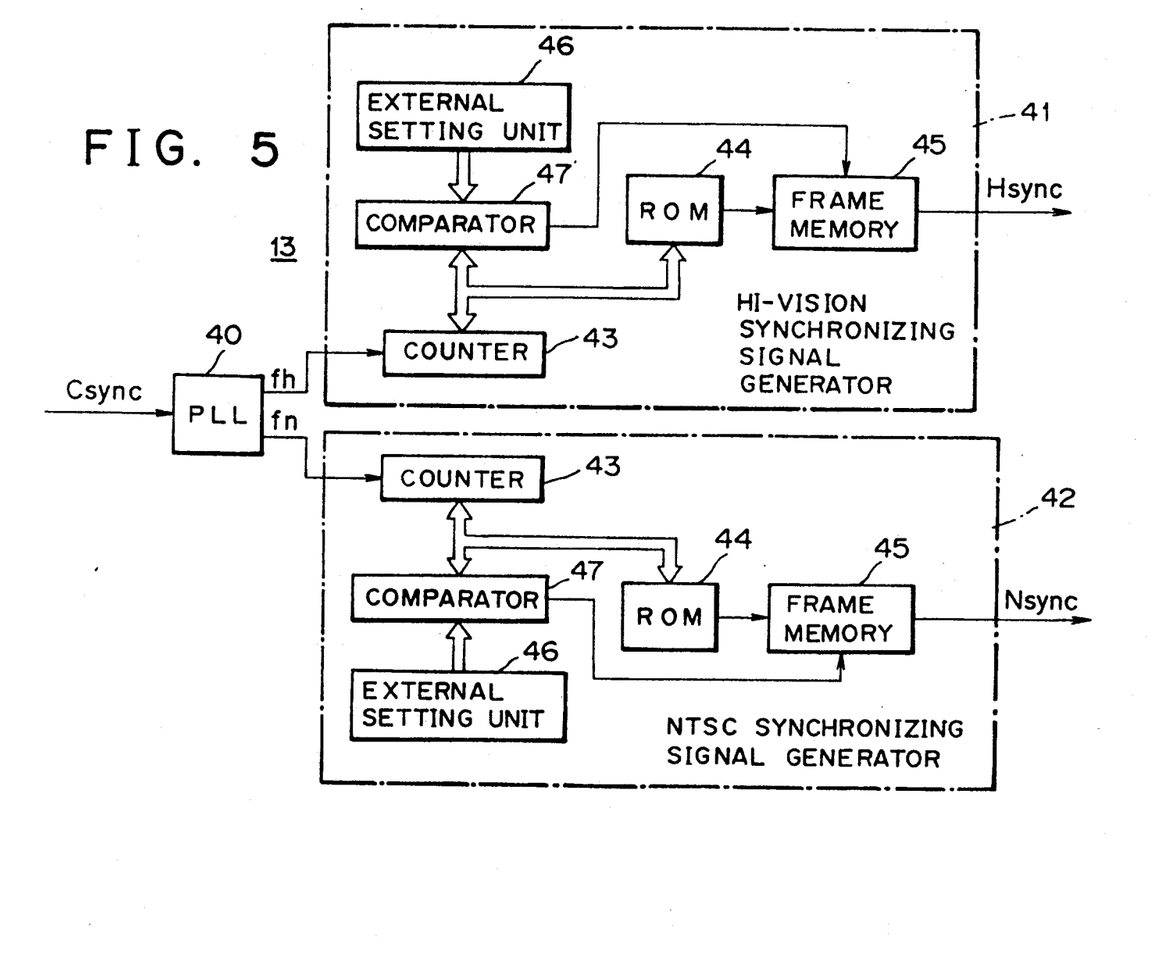
FIG. 5 is a block diagram showing a synchronizing signal generator and illustrating the portion of the system of FIG. 4.

The synchronizing signal generator 13 is a circuit for generating signals to provide a synchronization between the Hi-vision equipment 11 and the NTSC television equipment 12. As shown in FIG. 5, the synchronizing signal generator is comprised of a phase-locked loop (PLL) circuit 40 to be locked by a synchronizing signal Csync from external equipment for supplying a clock signal fh for Hi-vision circuits and a clock signal fn for NTSC television circuits, a Hi-vision synchronizing signal generator 41 for generating a Hi-vision synchronizing signal Hsync based on the clock signal fh, and an NTSC synchronizing signal generator 42 for generating an NTSC synchronizing signal Nsync based on the clock signal fn.

The synchronizing signal generators 41 and 42 have the same configuration with respect to each other, and the configuration of the Hi-vision synchronizing signal generator 41 will be described by way of example. The Hi-vision synchronizing signal generator 41 is comprised of a counter 43 for counting the clock signal fh, a read-only-memory (ROM) 44 which is addressed by an output of the counter 43, a frame memory 45 for storing an output from the ROM 44 amounting of one frame, and a comparator 47 for comparing an output of the counter 43 with an output of the external setting unit 46 and for resetting a readout operation of the frame memory 45 upon coincidence of the outputs, wherein an output of the frame memory 45 is supplied to the Hi-vision equipment 1 as a synchronizing signal Hsync.

The counter 43 in the Hi-vision synchronizing signal generator 41 for counting the clock signal fh is comprised of a 192-adic counter, while, the counter 43 in the NTSC synchronizing signal generator 42 for counting the clock signal fn is comprised of a 910-adic counter.

The synchronizing signal Hsync designates a horizontal synchronizing signal HD, a vertical synchronizing signal VD and a composite synchronizing signal Csync for the Hi-vision system. The synchronizing signal Nsync designates a horizontal synchronizing HD, a vertical synchronizing signal VD and a composite synchronizing signal Ccync for the NTSC television system.

Figure 6:
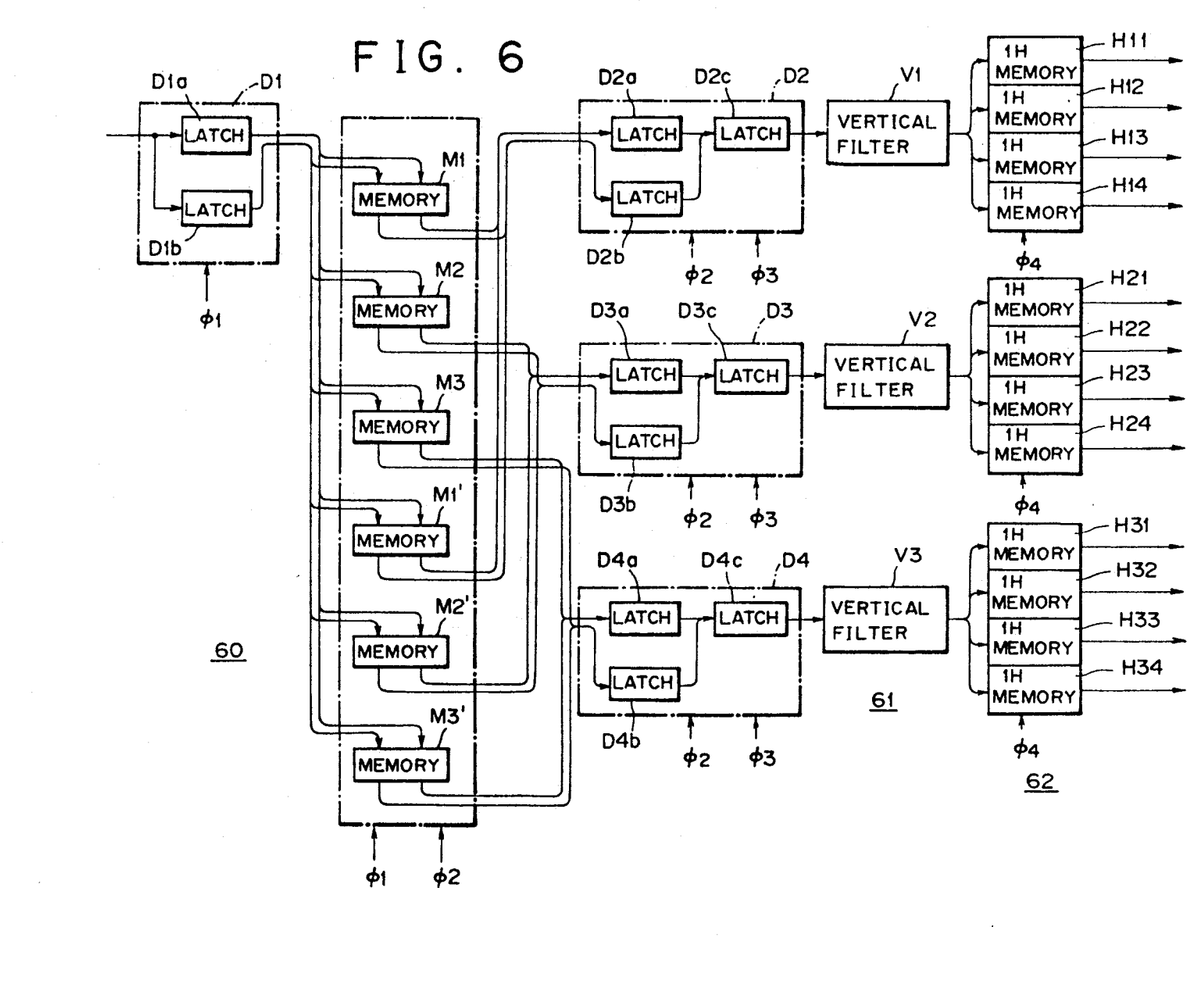
FIG. 6 is a block diagram showing a scan converter and illustrating the portion of the system of FIG. 4.

The scan converter 15 includes a vertical divider 60 for dividing a Hi-vision signal, which has been converted into a digital data by the A/D converter 14, into three parts in a vertical direction for every frame, as shown in FIG. 3B, a scanning line converter 61 for converting a number of the horizontal scanning lines with a ratio of 5 to 7, and a horizontal divider 62 for dividing each converted horizontal scanning line into four parts in a horizontal direction.

The vertical divider 60 is comprised of an input latch circuit D1 for latching the Hi-vision signal converted into the digital data, frame memories M1 to M3 and M1' to M3' for storing the scanning line data of the Hi-vision signal latched by the latch circuit D1 by dividing it into three parts in a vertical direction for every field, and output latch circuits D2 to D4 for combining the scanning line data stored in the memories M1 to M3 and M1' to M3' for every stage.

The input latch circuit D1 is comprised of a latch circuit D1a for latching the Hi-vision signal by a timing of a negative going edge of the clock signal, and a latch circuit D1b for latching the Hi-vision signal by a timing of a positive going edge thereof. The output latch circuits D2 to D4 are comprised of latch circuits D2a to D4a for latching outputs of the memories M1 to M3, latch circuits D2b to D4b for latching outputs of the memories M1' to M3', and latch circuits D2c to D4c for combining outputs of the both latch circuits D2a to D4a and D2b to D4b.

Figure 7:
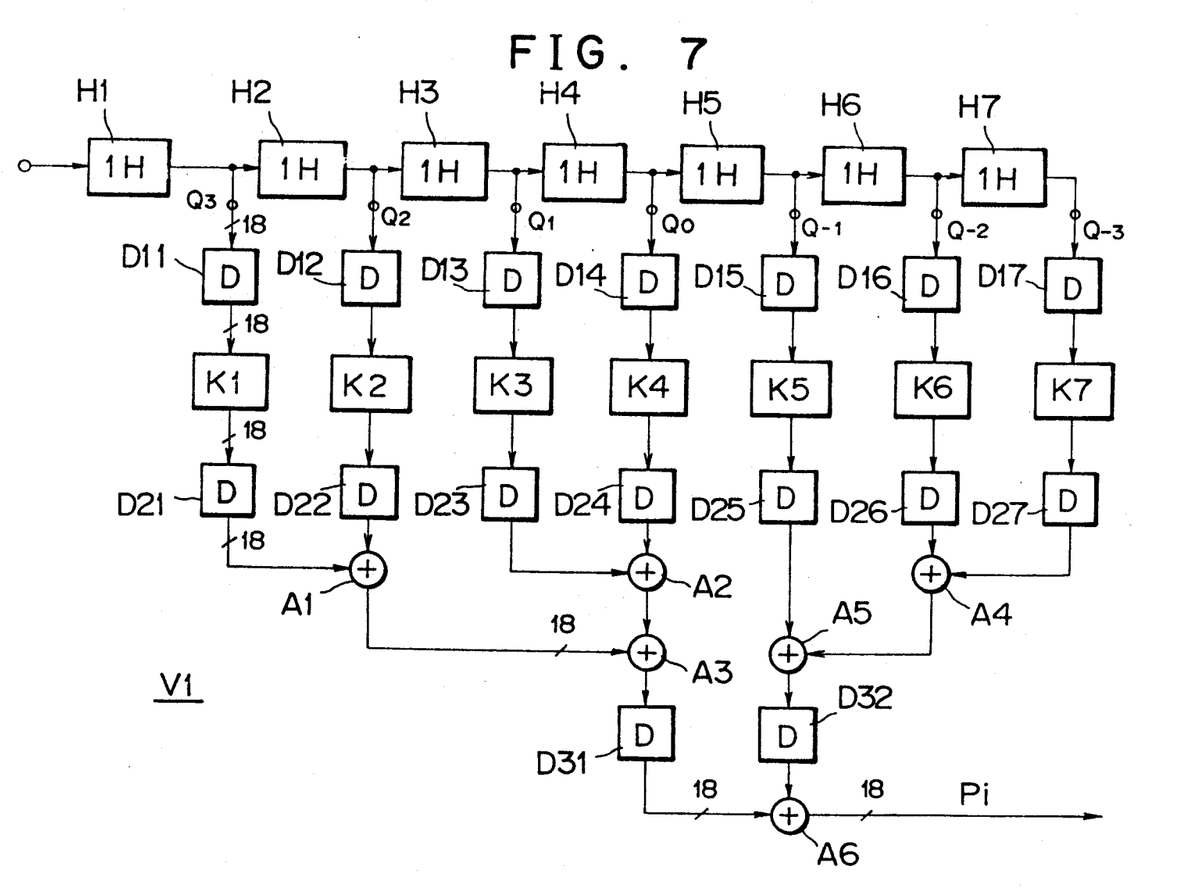
FIG. 7 is a block diagram showing a vertical filter and illustrating the portion of the scan converter of FIG. 6.

The scanning line converter 61 converts the scanning lines, which have been divided into three parts in a vertical direction, from five to seven lines for every stage and is comprised of vertical filters V1 to V3 having the same configuration with each other. As shown in FIG. 7, the vertical filter V1 has a configuration in which seven 1H memories H1 to H7, each of which delays an input data by an amount of 1H, are connected in series. Outputs of the memories H1 to H7 are fed to coefficient multiplier circuits K1 to K7 having PROM for multiplying a predetermined coefficient through latch circuits D11 to D17. Outputs from the coefficient multiplier circuits K1 to K7 are then fed to latch circuits D21 to D27, whereby outputs latched by the latch circuits D21 to D24 are fed to a latch circuit D31 after being added by adding circuits A1 to A3, while outputs latched by the latch circuits D25 to D27 are fed to a latch circuit D32 after being added by adding circuits A4 and A5. The data latched by the latch circuits D31 and D32 are finally added by an adding circuit A6 and then output.

The new scanning line data generated by the vertical filters V1 to V3 are supplied to the horizontal divider 62. The horizontal divider 62 divides the outputs of the vertical filter V1 to V3 into four parts respectively in a horizontal direction and is comprised of 1H memories H11 to H14 for dividing the output of the vertical filter V1 into four parts, 1H memories H21 to H54 for dividing the output of the vertical filter V2 into four parts, and 1H memories H31 to H34 for dividing the output of the vertical filter V3 into four parts. Each of the 1H memories H31 to H34 includes two 1H memories and thereby data is read-out from one 1H memory while data is written into the other 1H memory.

With this arrangement, a Hi-vision signal derived from the Hi-vision equipment 11 is converted into a 8-bit digital signal by the A/D converter 14 and then supplied to the input latch circuit D1 of the scan converter 15.

The input latch circuit D1 latches the input Hi-vision signal on the latch circuits D1a and D1b with timing based on the negative going edge and positive going edge of a clock signal $\phi 1$ (48.6 MHz). The scanning line data in the first ⅓ of a first field of data being latched on the latch circuit D1a are written into the memory M1, the subsequent scanning line data in the next ⅓ of the field are written into the memory M2 and then the last scanning line data in the last ⅓ of the field are written into the memory M3, respectively in accordance with the timing of the negative going edge of the clock signal $\phi 1$. The data of the same field latched on the latch circuit D1b are also written into the memories M1 to M3 in a similar manner in accordance with the timing of the positive going edge of the clock signal $\phi 1$. In this way, the data of the first field is divided into three parts in a vertical direction and written into the memories M1 to M3. However, since one horizontal scanning line is produced by an operational process to provide seven continuous horizontal scanning lines at the scanning line converter which will be described hereinafter, the last three horizontal scanning lines (H) to be written into the upper stage memory M1 are also written simultaneously into the middle stage memory M2 in view of the fact that the continuous seven horizontal scanning lines may extend over the memories M1 and M2. The same process is applied to the middle stage memory M2 and the lower stage memory M3, and that to the lower stage memory M3 and the upper stage memory M1.

The data of the second field are also written into each of the memories M1' to M3' in the same manner as the above-mentioned data storing of the first field.

In this way, the scanning line data which correspond to one frame of the Hi-vision signals are divided into three parts in a vertical direction for every field and stored in the frame memories M1 to M3 and M1' to M3'.

The scanning line data written into the memory M1 out of the scanning line data stored in the frame memories M1 to M3 and M1' to M3' are readout respectively with a timing of the negative going edge and that of positive going edge of a clock signal $\phi 2$ (11.3 MHz), and then latched by the latch circuits D2a and D2b of the output latch circuit D2. The data latched by the latch circuits D2a and D2b are combined by the latch circuit D2c, which operates with a clock signal $\phi 3$ (22.7 MHz) and supplies an output to the vertical filter V1. The data being stored in the memory M1' are fed to the vertical filter V1 through the latch circuit D2 in a similar manner.

The data stored in the memories M2 and M2' are also fed to the vertical filter V2 through the latch circuit D3, and that the data stored in the memories M3 and M3' to the vertical filter V3 through the latch circuit D3, respectively.

Operations of the vertical filters V1 to V3 will be described by making reference to the vertical filter V1.

The vertical filter V1 shifts incoming horizontal scanning line data sequentially to the 1H memories H1 to H7 for storing and thereby one scanning line data is produced from the successive seven scanning line data. If it is assumed that a signal derived from a 1H memory in a certain 1H section is designated as Qn and a signal to be derived from the same 1H memory in the next 1H section is designated as Qn+1, an output Pi may be defined by the following determinant.

$$\begin{bmatrix} P_0 \\ P_1 \\ P_2 \\ P_3 \\ P_4 \\ P_5 \\ P_6 \end{bmatrix} = \begin{bmatrix} h_{-21} & h_{-14} & h_{-7} & h_0 & h_7 & h_{14} & h_{21} & 0 & 0 & 0 \\ 0 & h_{-19} & h_{-12} & h_{-5} & h_2 & h_9 & h_{16} & h_{23} & 0 & 0 & 0 \\ 0 & h_{-24} & h_{-17} & h_{-10} & h_{-3} & h_4 & h_{11} & h_{18} & 0 & 0 & 0 \\ 0 & 0 & h_{-22} & h_{-15} & h_{-8} & h_{-1} & h_6 & h_{13} & h_{20} & 0 & 0 \\ 0 & 0 & 0 & h_{-20} & h_{-13} & h_{-6} & h_1 & h_8 & h_{15} & h_{22} & 0 \\ 0 & 0 & 0 & 0 & h_{-18} & h_{-11} & h_{-4} & h_3 & h_{10} & h_{17} & h_{24} \\ 0 & 0 & 0 & 0 & h_{-23} & h_{16} & h_{-9} & h_{-2} & h_5 & h_{12} & h_{19} \end{bmatrix} \times \begin{bmatrix} Q_{-3} \\ Q_{-2} \\ Q_{-1} \\ Q_0 \\ Q_1 \\ Q_2 \\ Q_3 \\ Q_4 \\ Q_5 \\ Q_6 \\ Q_7 \end{bmatrix}$$

where, $h_n$ is an inpulse response of the filter and $h_n = h_{-n}$.

Figure 8:
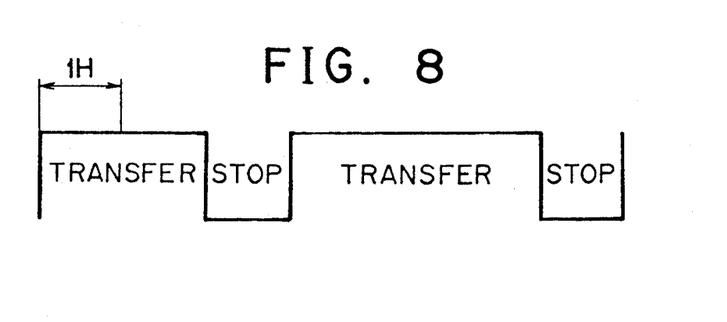
FIG. 8 is a timing chart illustrating an operation of the vertical filter of FIG. 7.

In this way, the successive seven scanning line data to be written into the 1H memories H1 to H7 are multiplied by a predetermined coefficient and resultants are added to produce a new one horizontal scanning line data Pi. That is, as shown in the timing chart in FIG. 8, the vertical filter V1 repeats the operation wherein each of the 1H memories H1 to H7 is operated to transfer data for the first 2H period, and stop the transferring of data for the next 1H period, hence, to transfer the data for the next 3H periods and stop the transferring for the last 1H period. In this case, constants K1 to K7 of each of the coefficient multiplier circuits are modified for every 1H period and an output is computed for every 1H period, so that seven horizontal scanning lines are generated by performing the transferring operation five times. Thus seven horizontal scanning lines are produced from five horizontal scanning lines.

Accordingly, the scanning line data processed by the 5 to 7 conversion at the vertical filters V1 to V3 are supplied to the horizontal scanning line divider 52 and divided into four parts in a horizontal direction. That is, outputs of the vertical filter are stored in 1H memories H11 to H14, outputs of the vertical filter V2 are stored in 1H memories H21 to H24, and that outputs of the vertical filter V3 in 1H memories H31 to H34 with a timing of a clock signal $\phi 4$ (5.67 MHz) in a sequential manner by every 1H.

Since each of the 1H memories H11 to H34 includes two 1H memories, an operation for reading data from one 1H memory with the timing of the clock signal $\phi 4$ while writing data into the other 1H memory with the timing of the clock signal $\phi 4$ is repeated alternatively.

In this way, twelve sets of horizontal scanning line data for one picture screen divided into three parts in a vertical direction and four parts in a horizontal direction through the scan converter 15 are in turn converted into NTSC television signals by the D/A converter 16 respectively and fed to the switcher 17.

The switcher 17 supplies the NTSC television signals being divided into twelve sets to the display unit 18 which is comprised of twelve NTSC television receiver sets #1 to #12, and switches any of the NTSC television signals selectively over to an NTSC television signal from the NTSC television equipment 12, thus, at the display unit 18, images from the Hi-vision equipment 11 and the image from the NTSC television equipment 12 can be displayed selectively.

However, since a signal supplied from the Hi-vision equipment 11 is delayed at the scan converter 15 over one field in time, the images from the Hi-vision equipment 11 and the image from the NTSC television equipment 12 are displayed on the display unit 18 with a displaced relationship in phase along the horizontal direction. Therefore, the synchronizing signal generator 13 controls a phase difference between the synchronizing signals Hsync and Nsync for preventing such relative displacement of images from occurring. In this case, the synchronizing signal supplied to the scan converter 15 is a composite synchronizing signal Csync in the synchronizing signal Hsync, the scan converter 15 detects a start of a field of a video signal, a start of scanning a line thereof and the like for making use of it in various processings operations in the scan converter 15.

Figure 9:
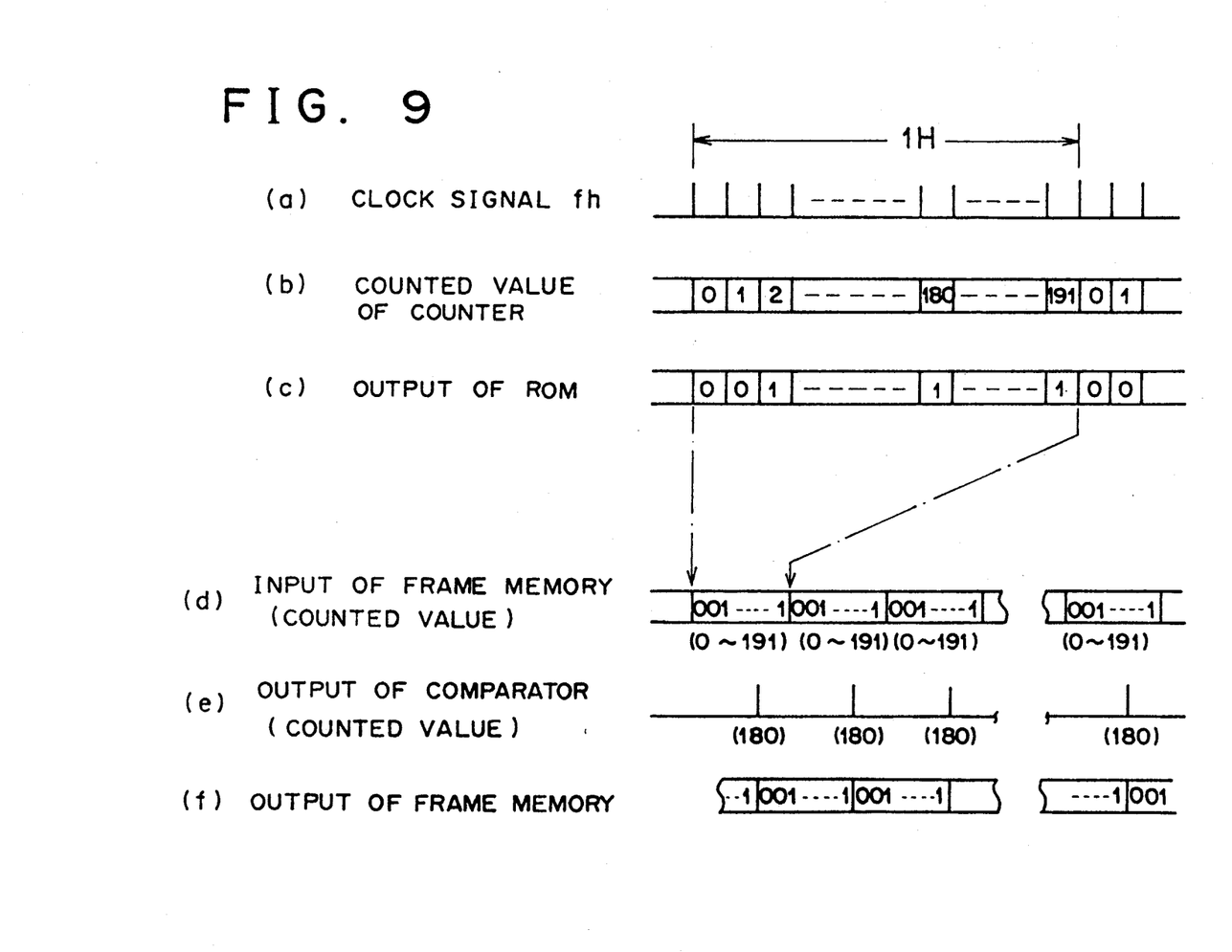
FIG. 9 is a timing chart illustration an operation of the synchronizing signal generator of FIG. 5.

FIG. 9 is a timing chart for illustrating an operation of the Hi-vision synchronizing signal generator 41 in the synchronizing signal generator 13. In FIG. 9, the clock signal fh (FIG. 9(a)) is counted by the 192-adic counter 43 and counted values of 0 through 191 (64 to 255 are used instead as a matter of convenience in the practical use of the counter) are derived therefrom (FIG. 9(b)). A ROM 44 is addressed by the counted values of 0 through 191 and supplies the Hi-vision synchronizing signal by an amount of 1H (FIG. 9(c)). This synchronizing signal is fed to the frame memory 45 (FIG. 9 (d)) and then the synchronizing signal for one frame is stored therein. The frame memory 45 has a DRAM core for storing input data and writing and reading of the data into and out of this DRAM core are controlled independently by means of an internal write address counter and an internal readout address counter. If a value of "180" is set as an amount of delay by the external setting unit 46, a coincidence pulse is derived from the comparator 47 for every counted value of "180" of the counter 43 (FIG. 9(e)). This coincidence pulse is then supplied to the frame memory 45 as a readout reset pulse. At the frame memory 45, the internal readout address counter is reset upon receipt of this reset pulse, data stored in the DRAM core are read-out again from a leading address and supplied as a synchronizing signal Hsync (FIG. 9(f)).

The NTSC synchronizing signal generator 42 supplies an NTSC synchronizing signal Nsync in the same manner. However, at the NTSC synchronizing signal generator 42, as it has been described above, the clock signal fn is stored as an input clock signal, the 910-adic counter is employed as the counter 43, and Nsync data is stored in the ROM 44.

It will be apparent from the foregoing description and drawings, the synchronizing signal Hsync derived from the Hi-vision synchronizing signal generator 41 and the synchronizing signal Nsync derived from the NTSC synchronizing signal generator 42 can be supplied by providing a phase difference therebetween. Therefore, this phase difference is so set as to have the same amount as that of the delay encountered in the scan converter 15, it is possible to establish a synchronization between the Hi-vision image and the NTSC television image to be displayed on the display unit 18.

In the above-mentioned preferred embodiments, the synchronizing signals Hsync and Nsync are produced from the synchronizing signal Csync fed from the external equipment. However, the synchronizing signal Hsync derived from the Hi-vision equipment 11 may be delayed by the synchronizing signal generator 13 for providing the synchronizing signal Nsync. Further, the synchronizing signal Nsync derived from the NTSC television equipment 12 may be delayed by the synchronizing signal generator 13 for providing the synchronizing signal Hsync.

According to this invention, it is possible to reduce noise in a high frequency range overlapping a high definition television signal with a simple means and further to reduce noise which may appear on a display screen when the high definition television signal is converted into the present television signal by utilizing a scan converter.

Further, in accordance with this invention, it is possible to display the image of a high definition television system by utilizing a plurality of present television receiver sets while keeping its high picture quality. In addition, it is possible to prevent a picture disturbance on the screen when changing-over the images between the images of the high definition television system and the image of the present television system.

What is claimed is:

1. A noise reduction circuit for a video signal comprising:
    first filter means for suppressing a signal level in a high frequency range of a video signal;
    coring means for cutting off a minute signal level of the video signal fed from said first filter means; and
    second filter means for suppressing a signal level in a low frequency range of the video signal fed from said coring means;
    wherein characteristics of said first and second filter means are so selected as to be flat in overall characteristic for reducing a noise overlapping the high frequency range of said video signal.

2. A noise reduction circuit for a video signal as set forth in claim 1, further including coring means for cutting off a signal less than a predetermined minute level in absolute value.

3. An image displaying system comprising:
    first video equipment for generating a high definition television signal;
    second video equipment for generating a second format television signal of a second format television system, wherein said high definition television signal is different from said second format television signal;
    image dividing means for dividing an image of the high definition television signal produced by said first video-equipment into a plurality of images in accordance with the second format television system;
    image displaying means comprising a plurality of television receiver sets of the second format television system for displaying, by switching over, a plurality of said divided images and an image of the second format television signal of the second format television system generated by said second video equipment; and synchronizing signal generating means for generating synchronizing signals in order to establish a synchronization between said first and second video equipments;

wherein said synchronizing signal generating means provides a phase difference between the synchronizing signals to be fed to said first and second video equipments for compensating a delay time of the high definition television signal encountered in said image dividing means.

4. An image displaying system as set forth in claim 3, further including switching means for switching a plurality of said dividend images and an image of the second format television signal of the second format television system in order to display on the image displaying means.

5. An image displaying system as set forth in claim 3, wherein said image dividing means divides an image of the high definition television signal into twelve images of the second format television signal of the second format television system; and image displaying means comprising twelve television receiver sets of the second format television system which are arranged three sets in a vertical direction and four sets in a horizontal direction.

6. An image displaying system as set forth in claim 3, wherein said image dividing means includes an analog-to-digital converter, a scan converter, and a digital-to-analog converter.

7. An image displaying system as set forth in claim 3, in which said high definition television signal is a Hi-vision signal and said second format television signal is an NTSC television signal.

8. An image displaying system as set forth in claim 3, wherein a noise reduction circuit is connected to the output of said first video equipment for receiving a video signal therefrom, said noise reduction circuit comprising:

first filter means for suppressing a signal level in a high frequency range of said video signal received form said first video equipment;

coring means for cutting off a minute signal level of the video signal fed from said first filter means; and second filter means for suppressing a signal level in a low frequency range of the video signal fed from said coring means;

wherein characteristics of said first and second filter means are so selected as to be flat in overall characteristic for reducing a noise overlapping the high frequency range of said video signal received from said first video equipment.

9. An image displaying system as set forth in claim 8, in which said noise reduction circuit further comprises coring means for cutting off a signal less than a predetermined minute level in absolute value.

* * * * *